US008880268B2

(12) United States Patent
Omi et al.

(10) Patent No.: US 8,880,268 B2
(45) Date of Patent: Nov. 4, 2014

(54) CONTROL DEVICE FOR HYBRID VEHICLE

(71) Applicant: Mitsubishi Jidosha Kogyo Kabushiki Kaisha, Tokyo (JP)

(72) Inventors: Yoshihiro Omi, Okazaki (JP); Jun Aizawa, Anjo (JP); Tatsuya Tawaki, Okazaki (JP)

(73) Assignee: Mitsubishi Jidosha Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/100,603

(22) Filed: Dec. 9, 2013

(65) Prior Publication Data

US 2014/0163795 A1 Jun. 12, 2014

(51) Int. Cl.
*B60L 9/00* (2006.01)
*B60W 20/00* (2006.01)

(52) U.S. Cl.
CPC ............. *B60W 20/10* (2013.01); *Y10S 903/902* (2013.01); *Y10S 903/93* (2013.01); *Y10S 903/903* (2013.01); *Y10S 903/906* (2013.01)
USPC ............... 701/22; 701/99; 701/102; 701/112; 701/123; 903/902; 903/930; 903/903; 903/906; 180/65.265; 180/65.21; 180/65.28; 180/65.285; 180/65.245; 903/902

(58) Field of Classification Search
CPC ............. Y10S 903/902; Y10S 903/93; Y10S 903/903; Y10S 903/906; B60W 20/10; B60W 10/08; B60W 10/06; B60W 20/00; B60W 20/40; B60W 10/26; B60W 20/30; B60W 2710/083; B60W 2510/244; B60W 2510/0657
See application file for complete search history.

(56) References Cited

U.S. PATENT DOCUMENTS

| 6,617,703 | B2 * | 9/2003 | Matsubara et al. .......... 290/40 C |
| 7,100,720 | B2 * | 9/2006 | Ishikawa .................... 180/65.26 |
| 2003/0042054 | A1 * | 3/2003 | Matsubara et al. .......... 180/65.2 |
| 2009/0229897 | A1 * | 9/2009 | Yutani et al. ............... 180/65.28 |
| 2012/0083385 | A1 * | 4/2012 | Smith et al. ........................ 477/5 |
| 2014/0179488 | A1 * | 6/2014 | Hori et al. ......................... 477/5 |
| 2014/0180521 | A1 * | 6/2014 | Tsuchikawa et al. ........... 701/22 |
| 2014/0180522 | A1 * | 6/2014 | Ideshio et al. ................... 701/22 |

FOREIGN PATENT DOCUMENTS

| JP | 2001-186602 A | 7/2001 |
| JP | 2003-9306 A | 1/2003 |
| JP | 2003-20972 A | 1/2003 |
| JP | 2009-97347 A | 5/2009 |

* cited by examiner

*Primary Examiner* — Redhwan k Mawari
(74) *Attorney, Agent, or Firm* — Birch, Stewart, Kolasch & Birch, LLP

(57) ABSTRACT

Assumed torque Tb is calculated based on an operation state of an engine when there is no abnormality in sensors, the engine is in a warm-up completion state, and a travel mode is a series mode, and actual torque Ta is calculated and friction torque Tf is calculated based on information on an actual amount of electric power generation of a generator. When the friction torque Tf is larger than an upper limit clip value, the upper limit clip value is the friction torque Tf, and when the friction torque Tf is smaller than the lower limit clip value, the lower limit clip value is the friction torque Tf, correction torque Tc is calculated, and an operation of an electronic control instrument of the engine is controlled so as to set the assumed torque Tb to the correction torque Tc.

4 Claims, 2 Drawing Sheets

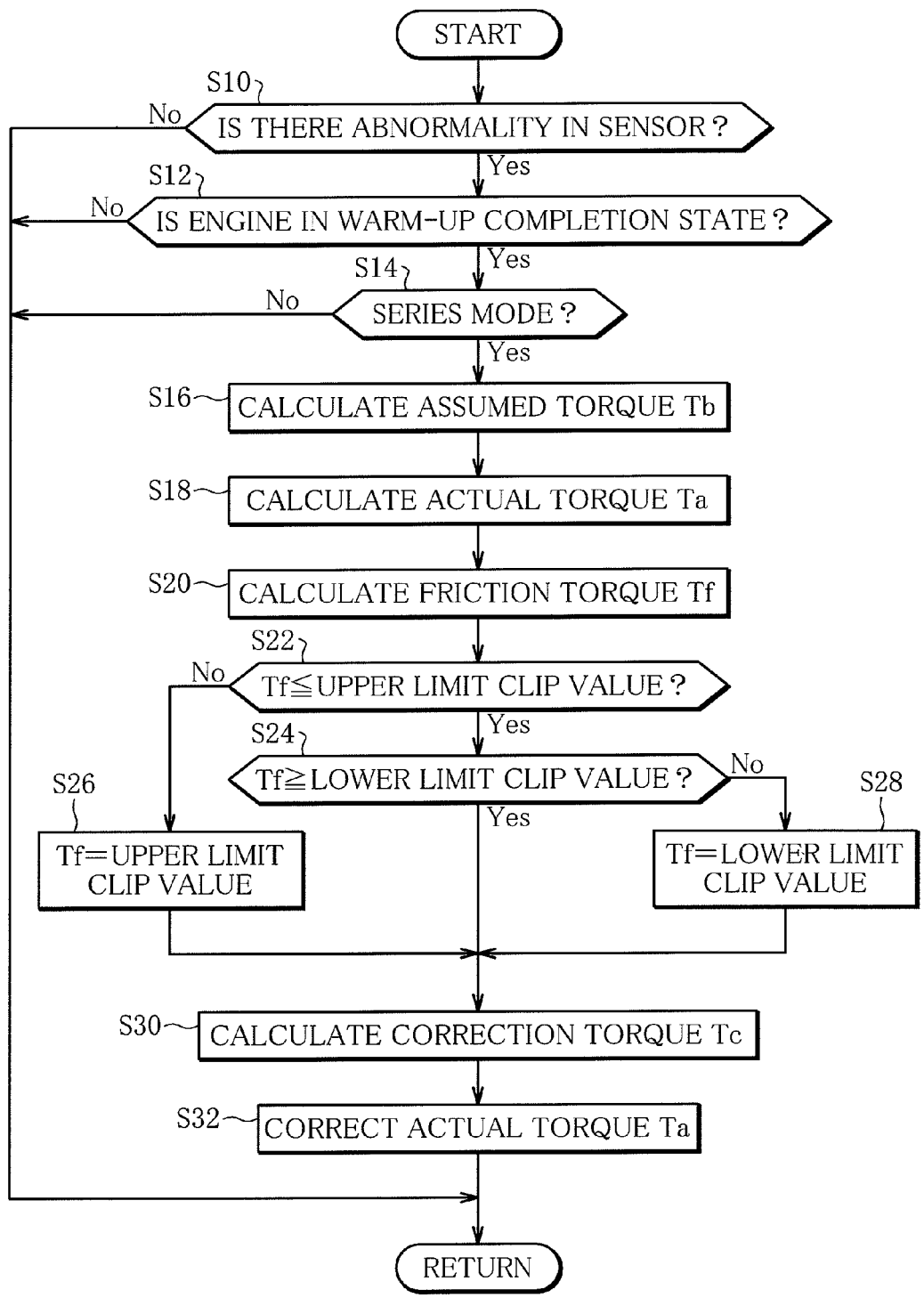

CONTROL DEVICE FOR HYBRID VEHICLE

BACKGROUND OF THE INVENTION

1. Field of the Invention

The present invention relates to a control device for a hybrid vehicle, and more particularly to friction learning of an internal combustion engine.

2. Description of the Related Art

In recent years, a hybrid vehicle has been developed that includes both an internal combustion engine (engine) and an electric motor, and has a parallel mode in which the vehicle travels using the engine and the electric motor as a power source, and a series mode in which a power generator is driven by power of the engine to generate electric power, which is used to drive the electric motor or charge a secondary battery. The engine provided in the hybrid vehicle has variations in parts that constitute the engine. The variations in the parts that constitute the engine cause variations in output torque of the engine.

The variations in the output torque of the engine causes variations in an amount of electric power generation of the power generator driven by the engine. For example, the variations in the output torque of the engine on an increase side of the amount of electric power generation of the power generator cause an excessive terminal voltage of the secondary battery, leading to a fault of a hybrid system. Also, the variations in the output torque of the engine on a decrease side of the amount of electric power generation of the power generator cause a constantly insufficient amount of electric power generation of the power generator, thereby reducing a state of charge (hereinafter referred to as SOC) of the secondary battery, which may disable the vehicle for traveling.

As an example of a method for estimating variations in output torque of an engine and correcting the output torque of the engine, a technique described in Japanese Patent Laid-Open No. 2009-97347 has a friction torque map for previously calculating friction torque of an engine depending on a temperature of engine cooling water, and corrects the friction torque of the engine calculated from the friction torque map based on a rotational speed difference between an assumed engine rotational speed and an actual engine rotational speed at start of the engine. Then, the output torque of the engine is adjusted based on the corrected friction torque of the engine.

A control device for an internal combustion engine described in Japanese Patent Laid-Open No. 2009-97347 corrects the friction torque of the engine based on the rotational speed difference between the assumed engine rotational speed and the actual engine rotational speed at start of the engine, and adjusts the output torque of the engine based on the corrected friction torque of the engine.

For example, it is considered that the technique described in Japanese Patent Laid-Open No. 2009-97347 is applied to correction of the output torque of the engine of the hybrid vehicle described above.

However, the hybrid vehicle drives the power generator or drive wheels immediately after start of the engine, and a load applied to the engine at start of the engine changes depending on the amount of electric power generation of the power generator or a traveling state of the vehicle such as a vehicle speed.

Thus, if the technique described in Japanese Patent Laid-Open No. 2009-97347 is applied to the hybrid vehicle, the amount of electric power generation of the power generator or the traveling state of the vehicle changes at each start of the engine, the load applied to the engine at start of the engine changes, and an actual engine rotational speed also changes. Thus, it is difficult to correct the friction torque of the engine depending on the rotational speed difference between the assumed engine rotational speed and the actual engine rotational speed.

SUMMARY OF THE INVENTION

The present invention is achieved to solve such a problem, and has an object to provide a control device for a hybrid vehicle that can accurately calculate friction torque of an internal combustion engine.

To achieve the object, the present invention provides a control device for a hybrid vehicle comprising: a mode switching unit for switching a travel mode of the vehicle, between a series mode in which drive wheels are driven by power of an electric motor driven by electric power generated by a power generator driven by power of an internal combustion engine, and a parallel mode in which the drive wheels are driven by power of the internal combustion engine and power of the electric motor driven by electric power supplied from a secondary battery; an operation state detection unit for detecting an operation state of the internal combustion engine; an assumed output value calculation unit for calculating an assumed output value of the internal combustion engine assumed based on the operation state of the internal combustion engine; an actual output value calculation unit for calculating an actual output value of the internal combustion engine based on an amount of electric power generation of the power generator; and a friction torque calculation unit for subtracting the actual output value from the assumed output value to calculate friction torque when the travel mode is the series mode.

Thus, when the travel mode is the series mode, the power generator is driven by power of the internal combustion engine to generate electric power, thereby allowing calculation of an actual output value of the internal combustion engine from the amount of electric power generation of the power generator in the series mode.

The assumed output value of the internal combustion engine is an output value in a standard state of the internal combustion engine previously determined by a test or the like and stored for each operation state of the internal combustion engine depending on a throttle valve opening, a fuel injection amount or the like in a case of no variations in parts that constitute the internal combustion engine, that is, in a case of the internal combustion engine in the standard state.

Thus, the actual output value is subtracted from the assumed output value as an output value of the internal combustion engine in the standard state, thereby allowing accurate calculation of friction torque due to variations in parts that constitute the internal combustion engine.

BRIEF DESCRIPTION OF THE DRAWINGS

The present invention will become more fully understood from the detailed description given hereinafter and the accompanying drawings which are given by way of illustration only, and thus, are not limitative of the present invention, and wherein:

FIG. 2 is a flowchart showing a control routine for correction control of engine output torque of the control device for a hybrid vehicle according to the present invention.

DETAILED DESCRIPTION OF THE INVENTION

Figure 1:
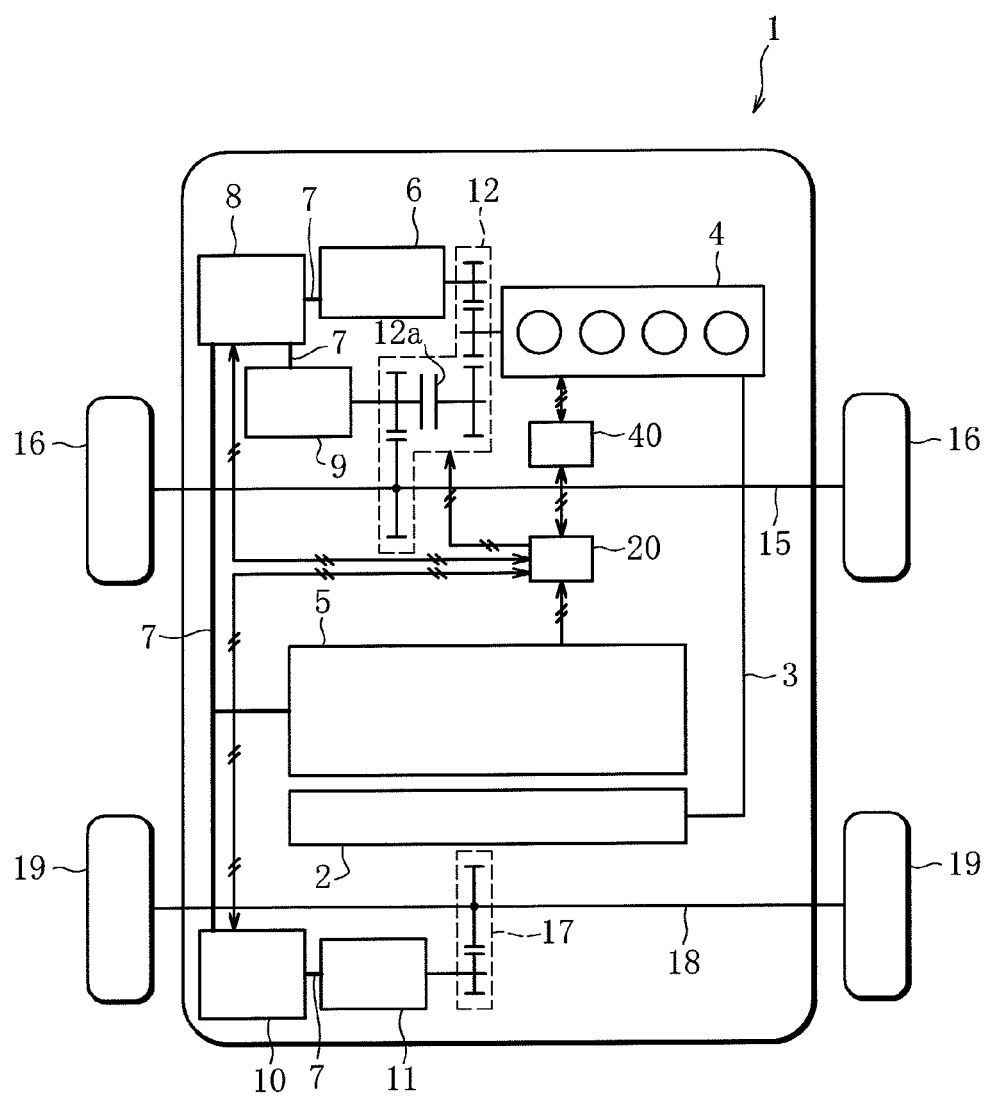
FIG. 1 is a schematic diagram of a vehicle to which a control device for a hybrid vehicle according to the present invention is applied.

Now, an embodiment of the present invention will be described with reference to the drawings.

FIG. 1 is a schematic diagram of a vehicle including a control device for a hybrid vehicle according to the present invention. Now, a configuration of the control device for a hybrid vehicle will be described.

As shown in FIG. 1, the control device for a hybrid vehicle according to the present invention includes an engine (internal combustion engine) 4, a high voltage battery (secondary battery) 5, a generator (power generator) 6, a front inverter 8, a front motor (electric motor) 9, a rear inverter 10, a rear motor (electric motor) 11, a reducer 12 including a clutch 12a therein, a hybrid control unit (an actual output value calculation unit) 20, and an engine control unit (an operation state detection unit, an assumed output value calculation unit, a friction torque calculation unit, an operation control unit, an operation control correction unit) 40 provided in the vehicle (hybrid vehicle) 1.

The vehicle 1 that uses the control device for a hybrid vehicle according to the present invention is a hybrid vehicle including, as traveling devices for the vehicle 1, the engine 4, the front motor 9, and the rear motor 11, wherein a charge cable extending from an external power supply is connected to a charging inlet lid (not shown), and the high voltage battery 5 can be charged by a charger.

The engine 4 includes a plurality of electronic control instruments (an operation state detection unit, an operation control unit) such as an electronic control throttle valve that controls a flow rate of air flowing into a combustion chamber (not shown) in the engine 4 or a fuel injection valve that supplies fuel into an intake passage (not shown). The engine 4 also includes a plurality of sensors (an operation state detection unit) such as a crank angle sensor that detects a rotational speed of the engine 4, a throttle opening sensor that detects a throttle opening of the electronic control throttle valve, and a water temperature sensor that detects a temperature of cooling water of the engine 4 The engine 4 is controlled by the engine control unit 40 based on a control signal such as requested output torque supplied from the hybrid control unit 20 to the engine control unit 40, and generates power using fuel supplied from a fuel tank 2 via a fuel pipe 3. The power generated by the engine 4 is transmitted to the generator 6 via the reducer 12 with a fixed change gear ratio, and the drive axle 15 that drives the drive wheels 16 via the clutch 12a included in the reducer 12.

The high voltage battery 5 includes a secondary battery such as a lithium-ion battery. The high voltage battery 5 also includes a battery module including a plurality of modules, each module including a plurality of battery cells having a cell monitoring unit that monitors the battery cells, and a battery monitoring unit that monitors a temperature and a state of charge (hereinafter referred to as SOC) of the battery module based on an output signal from the cell monitoring unit.

The generator 6 is driven by the engine 4 to generate electric power, and supplies the electric power to the high voltage battery 5, the front motor 9, and the rear motor 11 via the front inverter 8. The operation of the generator 6 is controlled by the front inverter 8.

The front inverter 8 includes a front motor control unit and a generator control unit, and controls an amount of electric power generation of the generator 6 and an output of the front motor 9 based on the control signal from the hybrid control unit 20. The generator control unit supplies information on an actual amount of electric power generation of the generator 6 to the hybrid control unit 20.

The front motor 9 is provided in a front part of the vehicle 1. The front motor 9 is driven by electric power of a high voltage generated by the generator 6 or electric power of a high voltage stored in the high voltage battery 5, which is supplied via a high voltage circuit 7. An operation of the front motor 9 is controlled by the front inverter 8, and the front motor 9 drives the drive wheels 16 via the reducer 12 and the drive axle 15.

The rear inverter 10 includes a rear motor control unit, and controls an output of the rear motor 11 based on the control signal from the hybrid control unit 20.

The rear motor 11 is provided in a rear part of the vehicle 1. The rear motor 11 is driven by electric power of a high voltage generated by the generator 6 or electric power of a high voltage stored in the high voltage battery 5, which is supplied via the high voltage circuit 7. An operation of the rear motor 11 is controlled by the rear inverter 10, and the rear motor 11 drives drive wheels 19 via a reducer 17 and a drive axle 18.

The reducer 12 includes the clutch 12a therein. The clutch 12a is mounted between the engine 4 and the drive axle 15, and connects/disconnects transmission of power of the engine 4 to the drive axle 15 based on the control signal from the hybrid control unit 20.

The hybrid control unit 20 is a control device for generally controlling the vehicle 1, and includes an input/output device, a storage device (ROM, RAM, nonvolatile RAM, or the like), a central processing unit (CPU), a timer, or the like.

To an input side of the hybrid control unit 20, the battery monitoring unit of the high voltage battery 5, the front motor control unit and the generator control unit of the front inverter 8, the rear motor control unit of the rear inverter 10, an accelerator position sensor that detects an accelerator opening and a sensor that detects a vehicle state such as a vehicle speed sensor (not shown), and the engine control unit 40 are connected, and detection information from these instruments are input.

On the other hand, to an output side of the hybrid control unit 20, the front motor control unit and the generator control unit of the front inverter 8, the rear motor control unit of the rear inverter 10, the reducer 12, and the engine control unit 40 are connected. The hybrid control unit 20 and the engine control unit 40 are connected by a controller area network in which the control units are connected to each other to allow high speed transfer of control information.

The hybrid control unit 20 supplies a control signal to the reducer 12, the engine control unit 40, the front motor control unit, the generator control unit, and the rear motor control unit based on detection information of the battery monitoring unit of the high voltage battery 5, the front motor control unit and the generator control unit of the front inverter 8, the rear motor control unit of the rear inverter 10, the accelerator position sensor and the sensor that detects a vehicle state such as a vehicle speed sensor, to control switching of the travel mode, outputs of the engine 4, the front motor 9, and the rear motor 11, and the amount of electric power generation of the generator 6.

Specifically, the travel mode includes an electric vehicle mode (hereinafter referred to as EV mode), a series mode, and a parallel mode. The hybrid control unit 20 switches the travel mode to the electric vehicle mode (hereinafter referred to as EV mode) with a sufficient SOC of the high voltage battery 5 and a low vehicle speed and a low load. Also, the hybrid control unit 20 switches the travel mode to the series mode when the SOC of the high voltage battery 5 is insufficient for the EV mode or when high electric power is required in acceleration or the like. The hybrid control unit 20 switches the travel mode to the parallel mode in traveling in a high speed region with high efficiency of the engine 4, that is, high fuel efficiency of the engine 4. The hybrid control unit 20 supplies a request signal to the engine control unit 40 so as to provide output of the engine 4 depending on the amount of electric power generation of the generator 6, the vehicle speed, and the load in the series mode and the parallel mode.

The EV mode is a series mode described later in which the operation of the engine 4 is stopped, the clutch 12*a* in the reducer 12 is disconnected, the front motor 9 and the rear motor 11 are driven by electric power stored in the high voltage battery 5, and the drive wheels 16 and 19 are driven by power of the front motor 9 and the rear motor 11 to cause the vehicle 1 to travel, that is, the engine 4 is not operated.

In the series mode, the clutch 12*a* in the reducer 12 is disconnected, the operation of the engine 4 is controlled, the generator 6 is driven by the engine 4 and, while the high voltage battery 5 is charged with electric power generated by the generator 6 so as to prevent the SOC of the high voltage battery 5 from being less than a predetermined value, the front motor 9 and the rear motor 11 are driven by electric power generated by the generator 6 and electric power stored in the high voltage battery 5, and the drive wheels 16 and 19 are driven by power of the front motor 9 and the rear motor 11 to cause the vehicle 1 to travel. Specifically, the series mode is a mode in which the vehicle 1 is not caused to travel by power of the engine 4.

In the parallel mode, the operation of the engine 4 is controlled, the generator 6 is driven by the engine 4, the front motor 9 and the rear motor 11 are driven by electric power generated by the generator 6 and electric power stored in the high voltage battery 5, the drive wheels 16 and 19 are driven by power of the front motor 9 and the rear motor 11, further, the clutch 12*a* in the reducer 12 is connected, the operation of the engine 4 is controlled, and the drive wheels 16 are driven by power of the engine 4 via the reducer 12 to cause the vehicle 1 to travel. Specifically, the parallel mode is a travel mode in which the vehicle 1 is caused to travel by power of the front motor 9, the rear motor 11, and the engine 4.

The hybrid control unit 20 calculates actual torque (actual output value) Ta of the engine 4 actually output by the engine 4 based on information on the actual amount of electric power generation supplied from the generator control unit of the front inverter 8. The information on the actual torque Ta is then supplied to the engine control unit 40.

The engine control unit 40 is a control device for generally controlling the engine 4, and includes an input/output device, a storage device (ROM, RAM, nonvolatile RAM, or the like), a central processing unit (CPU), a timer, or the like.

To an input side of the engine control unit 40, a plurality of electronic control instruments such as the electronic control throttle valve or the fuel injection valve provided in the engine 4, a plurality of sensors such as the crank angle sensor, the throttle opening sensor, an intake pressure sensor, and an air-fuel sensor provided in the engine 4, and the hybrid control unit 20 are connected, and detection information from these instruments and sensors are input.

On the other hand, to an output side of the engine control unit 40, the plurality of electronic control instruments provided in the engine 4 and the hybrid control unit 20 are connected.

The engine control unit 40 calculates output torque that can be generated in a standard state of the engine 4 without considering variations or the like in parts that constitute the engine 4, that is, assumed torque (assumed output value) Tb based on operation states of the plurality of electronic control instruments and detection results of the plurality of sensors. The assumed torque Tb is previously determined by a test, an analysis or the like, mapped, and stored as an assumed torque map in the engine control unit 40.

The engine control unit 40 controls the operation of the plurality of electronic control instruments to control a fuel injection amount, an intake air amount or the like so as to provide the actual torque Ta requested by the hybrid control unit 20 based on a request signal of the output of the engine 4 supplied from the hybrid control unit 20 and the assumed torque map.

The engine control unit 40 calculates friction torque Tf generated due to variations or the like in the parts that constitute the engine 4 based on the actual Ta supplied from the hybrid control unit 20 and the assumed torque Tb. Then, the engine control unit 40 calculates correction torque (correction output value) Tc for controlling the operation of the electronic control instrument of the engine 4 so that the actual torque Ta of the engine 4 is the output of the engine requested by the hybrid control unit 20 based on the friction torque Tf. Specifically, the correction torque Tc is a target value of the assumed torque Tb for the actual torque Ta of the engine 4 to be the output of the engine requested by the hybrid control unit 20.

Now, correction control of the engine output torque performed by the control device for a hybrid vehicle according to the present invention thus configured will be described.

FIG. 2 is a flowchart showing a control routine for the correction control of the engine output torque by the control device for a hybrid vehicle according to the present invention.

As shown in FIG. 2, in Step S10, it is determined whether or not there is an abnormality in a sensor. Specifically, it is determined whether or not there is an abnormality in any of the plurality of sensors such as the crank angle sensor, the throttle opening sensor, and the water temperature sensor provided in the engine 4. When the determination result is true (Yes), and there is an abnormality in any of the plurality of sensors, the routine is returned. When the determination result is false (No), and there is no abnormality in any of the plurality of sensors, the process proceeds to Step S12.

In Step S12, it is determined whether or not the engine 4 is in a warm-up completion state. Specifically, it is determined whether or not the engine 4 is in the warm-up completion state from detection results of the water temperature sensor provided in the engine 4, a temperature sensor that detects a temperature of an exhaust gas purification catalyst for purifying exhaust gas, or the like. When the determination result is Yes, and the engine 4 is in the warm-up completion state, the process proceeds to Step S14. When the determination result is No, and the engine 4 is not in the warm-up completion state, the routine is returned.

In Step S14, it is determined whether or not the travel mode is the series mode. When the determination result is true (Yes), and the travel mode is the series mode, the process proceeds to Step S16. When the determination result is false (No), and the travel mode is not the series mode, the routine is returned.

In Step S16, the assumed torque Tb is calculated. Specifically, the assumed torque Tb is calculated based on the operation state of the engine 4 determined from the operation states of the plurality of electronic control instruments and the detection results of the plurality of sensors. Then, the process proceeds to Step S18. The assumed torque Tb is an output value of the engine 4 in the standard state of the engine 4 previously determined by a test or the like for each operation state of the engine 4 depending on the throttle valve opening, the fuel injection amount or the like in a case of no variations in the parts that constitute the engine 4, that is, in a case of the engine 4 in the standard state. The assumed torque Tb is calculated by the mapped assumed torque map.

In Step S18, the actual torque Ta is calculated. Specifically, the hybrid control unit 20 calculates the actual torque Ta of the engine 4 based on information on the actual amount of electric power generation of the generator 6 supplied from the generator control unit of the front inverter 8. Then, the process proceeds to Step S20.

In Step S20, the friction torque Tf is calculated. Specifically, the actual torque Ta is subtracted from the assumed torque Tb to calculate the friction torque Tf. Then, the process proceeds to Step S22.

In Step S22, it is determined whether or not the friction torque Tf is an upper limit clip value or less. When the determination result is true (Yes), and the friction torque Tf is the upper limit clip value or less, the process proceeds to Step S24. When the determination result is false (No), and the friction torque Tf is not the upper limit clip value or less, the process proceeds to Step S26.

In Step S24, it is determined whether or not the friction torque Tf is a lower limit clip value or more. When the determination result is true (Yes), and the friction torque Tf is the lower limit clip value or more, the process proceeds to Step S30. When the determination result is false (No), and the friction torque Tf is not the lower limit clip value or more, the process proceeds to Step S28.

In Step S26, the friction torque Tf is set to the upper limit clip value. Then, the process proceeds to Step S30.

In Step S28, the friction torque Tf is set to the lower limit clip value. Then, the process proceeds to Step S30.

In Step S30, the correction torque Tc is calculated. Specifically, the friction torque Tf is added to the assumed torque Tb to calculate the correction torque Tc. Then, the process proceeds to Step S32.

In Step S32, the actual torque Ta is corrected. Specifically, the operation of the electronic control instrument of the engine 4 is controlled so as to set the assumed torque Tb of the engine 4 to the correction torque Tc, so that the actual torque Ta is the output of the engine requested by the hybrid control unit 20. Then, the routine is returned.

As such, the control device for a hybrid vehicle according to the present invention calculates the assumed torque Tb based on the operation state of the engine 4 determined from the operation states of the plurality of electronic control instruments and the detection results of the plurality of sensors when there is no abnormality in the sensors provided in the engine 4, the engine 4 is in the warm-up completion state, and the travel mode is the series mode. The hybrid control unit 20 calculates the actual torque Ta of the engine 4 based on information on the actual amount of electric power generation of the generator 6 supplied from the generator control unit of the front inverter 8. Then, the actual torque Ta is subtracted from the assumed torque Tb to calculate the friction torque Tf. When the friction torque Tf is larger than the upper limit clip value, the upper limit clip value is the friction torque Tf, and when the friction torque Tf is smaller than the lower limit clip value, the lower limit clip value is the friction torque Tf. Then, the friction torque Tf is added to the assumed torque Tb to calculate the correction torque Tc. Then, the operation of the electronic control instrument of the engine 4 is controlled to set the assumed torque Tb to the correction torque Tc, so that the actual torque Ta of the engine 4 is the output of the engine requested by the hybrid control unit 20.

As such, when the travel mode is the series mode, the actual torque Ta of the engine 4 calculated based on the information on the actual amount of electric power generation of the generator 6 is subtracted from the assumed torque Tb of the engine 4 calculated based on the operation state of the engine 4 to calculate the friction torque Tf.

When the travel mode is the series mode, the generator 6 is driven by power of the engine 4 to generate electric power, thereby allowing calculation of the actual torque Ta generated by the engine 4 from the amount of electric power generation of the generator 6 in the series mode.

The assumed torque Tb of the engine 4 is the output value of the engine 4 in the standard state previously determined by a test or the like and stored for each operation state of the engine 4 depending on the throttle valve opening, the fuel injection amount or the like in a case of no variations in the parts that constitute the engine 4, that is, in a case of the engine 4 in the standard state.

Thus, the actual torque Ta is subtracted from the assumed torque Tb as the output value of the engine 4 in the standard state, thereby allowing accurate calculation of the friction torque Tf due to variations in the parts that constitute the engine 4. For the friction torque Tf, the actual torque Ta of the engine 4 is sometimes larger than the assumed torque Tb depending on variations in the parts that constitute the engine 4.

Also, the friction torque Tf is calculated when the engine 4 is in the warm-up completion state. This allows accurate calculation of the friction torque Tf due to variations in the parts that constitute the engine 4 because, for example, there is no influence of an increase in the friction torque Tf due to an increase in viscosity of a lubricant caused by a low temperature of the lubricant, or a reduction in the actual torque Ta of the engine 4 due to poor combustion caused by a low temperature of the cooling water of the engine 4.

When the calculated friction torque Tf is larger than the upper limit clip value, the friction torque Tf is set to the upper limit clip value, and when the calculated friction torque Tf is smaller than the lower limit clip value, the friction torque Tf is set to the lower limit clip value. This can prevent the friction torque Tf from being a positively or negatively excessive abnormal value, resulting from the fact that the assumed torque Tb is excessively larger or smaller than the actual torque Ta due to, for example, false calculation of the assumed torque Tb caused by false detection of the operation state of the engine 4, or false calculation of the actual torque Ta caused by some trouble.

Thus, when the actual torque Ta of the engine 4 is corrected considering the friction torque Tf, excessive correction of the actual torque Ta of the engine 4 can be prevented when the friction torque Tf is larger than the upper limit clip value or smaller than the lower limit clip value.

Also, the friction torque Tf is added to the assumed torque Tb of the engine 4 to calculate the correction torque Tc, and the operation of the electronic control instrument of the engine 4 is controlled so as to set the assumed torque Tb to the correction torque Tc.

Thus, the operation of the engine 4 is controlled so as to set the assumed torque Tb of the engine 4 to the correction torque Tc considering the friction torque Tf. This can prevent a fault of the hybrid system which may be caused by the fact that variations in the actual torque Ta of the engine 4 on an increase side increase the amount of electric power generation of the generator 6 and causes an excessive terminal voltage of the high voltage battery 5 and a reduction in SOC of the high voltage battery 5 due to a constantly insufficient amount of electric power generation of the generator 6 caused by the fact that variations in the actual torque Ta of the engine 4 on a decrease side reduce the amount of electric power generation of the generator 6, under the influence of the friction torque Tf.

What is claimed is:
1. A control device for a hybrid vehicle comprising:
a mode switching unit for switching a travel mode of the vehicle, between a series mode in which drive wheels are driven by power of an electric motor driven by electric power generated by a power generator driven by power of an internal combustion engine, and a parallel mode in which the drive wheels are driven by power of the internal combustion engine and power of the electric motor driven by electric power supplied from a secondary battery;

an operation state detection unit for detecting an operation state of the internal combustion engine;

an assumed output value calculation unit for calculating an assumed output value of the internal combustion engine assumed based on the operation state of the internal combustion engine;

an actual output value calculation unit for calculating an actual output value of the internal combustion engine based on an amount of electric power generation of the power generator; and a friction torque calculation unit for subtracting the actual output value from the assumed output value to calculate friction torque when the travel mode is the series mode;

wherein the friction torque calculation unit has an upper limit clip value and a lower limit clip value, when the friction torque is larger than the upper limit clip value, the friction torque is set to the upper limit clip value, and when the friction torque is smaller than the lower limit clip value, the friction torque is set to the lower limit clip value.

2. The control device for a hybrid vehicle according to claim 1, wherein the friction torque calculation unit calculates the friction torque after warm-up completion of the internal combustion engine based on the operation state of the internal combustion engine.

3. The control device for a hybrid vehicle according to claim 1, further comprising:

an operation control unit for controlling the operation of the internal combustion engine; and an operation control correction unit for correcting the assumed output value of the internal combustion engine based on the friction torque to calculate a correction output value, and controlling the operation control unit so as to set the assumed output value to the correction output value.

4. The control device for a hybrid vehicle according to claim 2, further comprising:

an operation control unit for controlling the operation of the internal combustion engine; and an operation control correction unit for correcting the assumed output value of the internal combustion engine based on the friction torque to calculate a correction output value, and controlling the operation control unit so as to set the assumed output value to the correction output value.

* * * * *